No. 656,103. Patented Aug. 14, 1900.
W. FORKER & W. MITCHELL.
MINER'S OR CAMP STOVE.
(Application filed Dec. 9, 1899.)
(No Model.) 2 Sheets—Sheet 1.
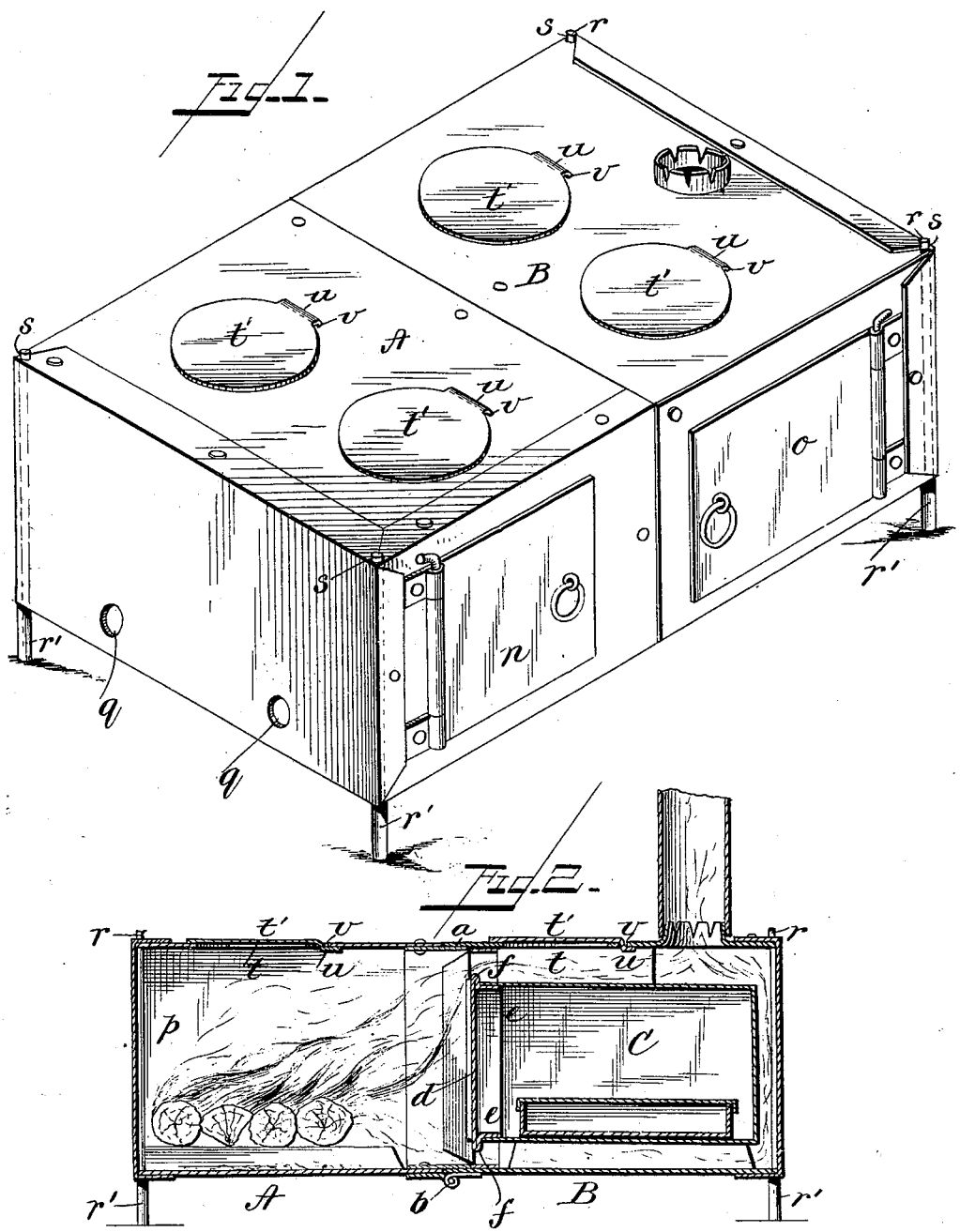

No. 656,103. Patented Aug. 14, 1900.
W. FORKER & W. MITCHELL.
MINER'S OR CAMP STOVE.
(Application filed Dec. 9, 1899.)
(No Model.) 2 Sheets—Sheet 2.
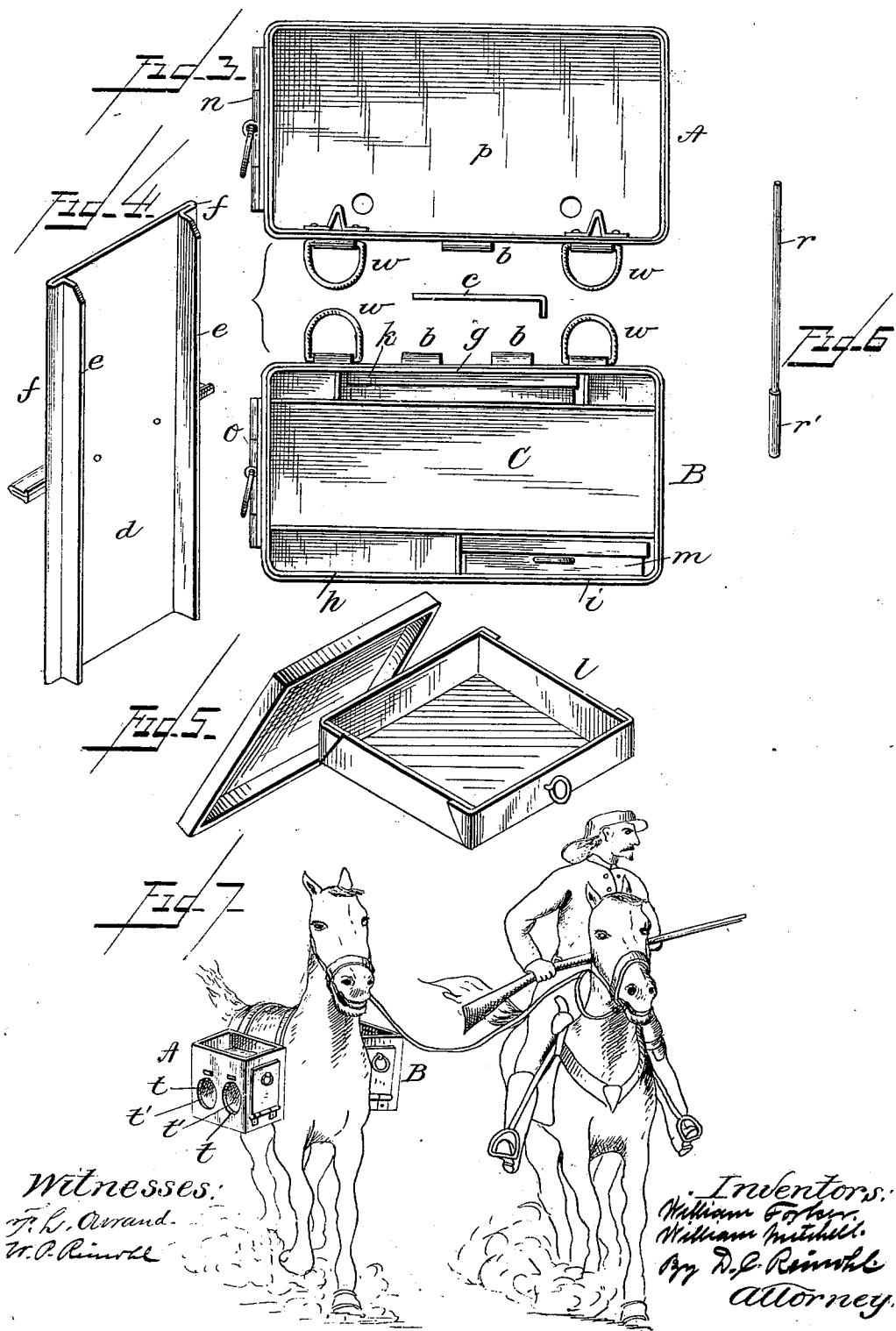

UNITED STATES PATENT OFFICE.

WILLIAM FORKER AND WILLIAM MITCHELL, OF GLENWOOD SPRINGS, COLORADO.

MINER'S OR CAMP STOVE.

SPECIFICATION forming part of Letters Patent No. 656,103, dated August 14, 1900.

Application filed December 9, 1899. Serial No. 739,755. (No model.)

*To all whom it may concern:*

Be it known that we, WILLIAM FORKER and WILLIAM MITCHELL, citizens of the United States, residing at Glenwood Springs, in the county of Garfield and State of Colorado, have invented certain new and useful Improvements in Miners' or Camp Stoves; and we do hereby declare the following to be a full, clear, and exact description of the invention, such as will enable others skilled in the art to which it appertains to make and use the same.

Our invention relates to stoves, has especial reference to that class of stoves designed for use of miners, frontiersmen, or others who are required to move from place to place, has for its object a portable stove which can be strapped upon the back of an animal and used as a pannier to be packed with food and camp equipage for convenience of transportation, and consists in certain improvements in construction which will be fully disclosed in the following specification and claims.

In the accompanying drawings, which form part of this specification, Figure 1 represents a perspective of our invention; Fig. 2, a vertical longitudinal section; Fig. 3, a top plan view of the stove separated and each section in position to be packed; Fig. 4, a perspective of the detachable end of the oven; Fig. 5, a perspective of one of the pans or packing-boxes; Fig. 6, a side view of one of the stove-legs, and Fig. 7 a perspective showing our stove upon the back of a pack-animal.

Reference being had to the drawings and the letters thereon, A B indicate the two sections, respectively, of our stove, the section A being the firing end and B the part which contains the oven C, and the sections are connected by a telescopic or overlapping joint at $a$ and the two parts secured together by a hinge $b$, as shown in Fig. 2, the pintle $c$ of the hinge being removable, as shown in Fig. 3, for separation of the sections to be packed for the march from one camp to another.

The end $d$ of the oven nearest the fire-chamber is removably secured in the oven by horizontal flanges $e$, which enter the oven, between the upper and lower sides thereof, and the vertical flanges $f$ prevent the end being pushed too far in the oven, and also prevent escape of heat at the joint when the oven is in use, and this removable end of the oven admits of the oven being used to pack provisions or other articles therein for transportation, and the end $d$ becomes a cover for the receptacle.

The spaces $g$, $h$, and $i$ are used to store packing-boxes $k$, $l$, and $m$, which may contain knives, forks, spoons, plates, bake-pans, or other like articles for transportation. These boxes may also be used as pans for baking or other purposes.

The section A is provided with a door $n$ to insert fuel, and the section B with a door $o$ to insert and remove articles from the oven, and air is admitted to the fire-box $p$ through openings $q$ $q$.

The legs $r$ are formed of rods enlarged at one end to form supports $r'$ and are inserted through holes $s$ in the bottom and top of the stove in each corner, and the rods extend through the holes in the top of the stove.

The stove is provided with openings $t$ to receive cooking utensils, such as pots or kettles, and with reversible lids or covers $t'$, which are provided with extensions $u$, bent downward and then outward and enter a slot $v$ in the top of the stove adjacent to the openings to prevent the covers being accidentally displaced when in use on the outside of the stove or when placed on the inside of the stove over the openings for transportation to prevent articles from falling out, as shown in Fig. 7.

The covers over the openings above the oven may be put inside when packing for transportation, the packing-boxes $l$ and $m$ serving to close or cover the said openings.

Each section A B is provided with rings $w$ on one side, preferably the lower side and near the adjacent ends of the sections, by which the sections are secured pannier-like to a pack-saddle or across the back of an animal by suitable straps.

The stove is made of sheet iron or steel, is light and durable, is easily set up for use, and knocked down for packing and transportation.

Having thus fully described our invention, what we claim is—

1. A sectional sheet-metal stove separable transversely and each section provided with rings on the lower side and near the inner end thereof for supporting it pannier-like on an animal and means for securing the sections in connected position.

2. A sectional stove having a fire-box and an oven in the same horizontal plane, separable at a point adjacent to the inner end of the oven, means for securing the sections in connected position and each section provided with rings on its lower side and near the inner end thereof for supporting it pannier-like on the back of an animal.

3. A sectional stove separable transversely near the oven, means for detachably securing the sections and each section provided with rings on the lower side and near the inner end thereof for suspending it pannier-like on the back of an animal.

4. A sectional stove having a fire-box and an oven in the same horizonal plane, separable at a point adjacent to the inner end of the oven and connected by a separable hinge, and each section provided with means on the lower side and near the inner end thereof for supporting it pannier-like on the back of an animal.

5. A sectional stove separable transversely near the oven and having a removable end for the oven adjacent to the fire-box, and each section provided with means on the lower side and near the inner end thereof for suspending it pannier-like on the back of an animal.

6. A sectional stove separable transversely adjacent to the inner end of the oven and having spaces on the upper and lower sides of the oven; in combination with packing-boxes constructed to enter said spaces for transportation.

In testimony whereof we affix our signatures in presence of two witnesses.

WILLIAM FORKER.
WILLIAM MITCHELL.

Witnesses:
S. J. DE LAU,
R. STEES.